United States Patent
Northcott

(10) Patent No.: US 6,697,332 B1
(45) Date of Patent: Feb. 24, 2004

(54) FORWARD PERFORMANCE MONITORING CELL GENERATION IN ATM OAM PROCESSING

(75) Inventor: Philip Lyon Northcott, Coquitlam (CA)

(73) Assignee: PMC-Sierra, Inc., Burnaby (CA)

( * ) Notice: Subject to any disclaimer, the term of this patent is extended or adjusted under 35 U.S.C. 154(b) by 768 days.

(21) Appl. No.: 09/616,382

(22) Filed: Jul. 13, 2000

(51) Int. Cl.$^7$ .................................................. H04J 1/16
(52) U.S. Cl. ........................ 370/236; 370/252; 370/414
(58) Field of Search ................................. 370/230, 231, 370/232, 235, 236, 252, 253, 395.1, 412, 413, 414, 415

(56) References Cited

U.S. PATENT DOCUMENTS

| | | | | |
|---|---|---|---|---|
| 5,570,348 A | * | 10/1996 | Holden ........................ | 370/236 |
| 5,784,358 A | * | 7/1998 | Smith et al. ................ | 370/230 |
| 5,787,072 A | * | 7/1998 | Shimojo et al. ............ | 370/231 |
| 6,141,323 A | * | 10/2000 | Rusu et al. .................. | 370/236 |
| 6,226,293 B1 | * | 5/2001 | Sakayori ................... | 370/236.2 |
| 6,333,917 B1 | * | 12/2001 | Lyon et al. .................. | 370/236 |
| 6,449,255 B1 | * | 9/2002 | Waclawsky ................. | 370/236 |

FOREIGN PATENT DOCUMENTS

JP    411027279 A  *  1/1999  ........... H04L/12/28

OTHER PUBLICATIONS

ITU–T Recommendation I.610— "B–ISDN Operation and Maintenance Principles and Functions", Feb. 1999.
ITU–T Recommendation I.356— "B–ISDN ATM Layer Cell Transfer Performance", Oct., 1996.
ATM Forum Traffic Management Specification version 4.1, AF–TM–0121.000, Mar., 1999.

* cited by examiner

Primary Examiner—Ricky Ngo
Assistant Examiner—Alan V. Nguyen
(74) Attorney, Agent, or Firm—Oyen Wiggs Green & Mutala

(57) ABSTRACT

Forward performance monitoring cells are inserted into a processing queue coupled to an access controller. A plurality of ATM cell input sources are coupled to the controller. Each source supports a plurality of ATM connections. The controller controllably admits cells from the input sources into the queue. Before a forward performance monitoring cell corresponding to a particular ATM connection is inserted into the queue, an interim cell corresponding to that connection is first transmitted to the controller, which controllably admits the interim cell into the queue. The queue is monitored to detect the presence of the interim cell in the queue, without interrupting maintenance of counts for the respective ATM connections. Then, while the interim cell remains within the queue, the count for the ATM connection corresponding to that interim cell is stored in the interim cell, thereby converting the interim cell into the desired forward performance monitoring cell.

14 Claims, 7 Drawing Sheets

FORWARD PERFORMANCE MONITORING CELL GENERATION IN ATM OAM PROCESSING

TECHNICAL FIELD

This invention relates to generation and insertion of forward performance monitoring ("Fwd PM") cells during operation and maintenance ("OAM") processing of cell traffic in asynchronous transfer mode ("ATM") layer devices.

BACKGROUND

As shown in FIG. 1, an ATM layer device 10 (everything to the left of network cloud 12) receives ATM cells from any one of a potentially large plurality of input sources 14A, 14B, 14C, 14D, etc. Each input source carries cells corresponding to a potentially large number of ATM connections. ATM layer device 10 processes the received cells and outputs them to network 12 (or to an ATM switch, not shown), by placing each cell in an appropriate one of a number of output queues 16A, 16B, 16C, 16D, etc. corresponding to input sources 14A, 14B, 14C, 14D, etc. As is well known, such processing involves carefully controlled admission of cells from the input sources by access controller 18 so as to avoid head-of-line blocking problems, facilitate proper management of the output buffers, and generally to provide a well-controlled traffic stream. The OAM performance monitoring ("OAM-PM") functionality of ATM layer device 10 (as defined in ITU-T Recommendation I.610—"B-ISDN Operation and Maintenance Principles and Functions", February 1999, hereafter "ITU-T I.610") is represented schematically in FIG. 1 by performance manager ("PM") sub-block 20.

More specifically, FIG. 2 provides an enlarged depiction of ATM layer device 10. For ease of illustration, only three ATM cell input sources 14A 14B, 14C and their corresponding output queues 16A, 16B, 16C are shown. Input source 14A and its corresponding output queue 16A is depicted as currently carrying cells corresponding to connections "12", "11" and "14"; input source 14B and its corresponding output queue 16B is depicted as currently carrying cells corresponding to connections "3", "4" and "1"; and, input source 14C and its corresponding output queue 16C is depicted as currently carrying cells corresponding to connection "7". Access controller 18 admits cells from the input sources into processing queue 22, and performs various operations on the cells as they pass through processing queue 22, including identifying the connection each cell belongs to, identifying the PM session associated with that connection, and performing other ATM layer functions such as policing and fault management. PM 20 monitors the cell traffic stream passing through processing queue 22 to output queues 16A, 16B, 16C, and counts the number of cells on each connection.

Periodically, PM 20 inserts a Forward Performance Monitoring ("Fwd PM") cell into the cell stream within processing queue 22, as prescribed by ITU-T I.610 and ITU-T Recommendation I.356—"B-ISDN ATM Layer Cell Transfer Performance", October, 1996 (hereafter ITU-T I.356). More particularly, one Fwd PM cell is inserted for every approximately N cells on a connection, where N ranges from 128 to 32768 depending on the data rate of the connection. Because the Fwd PM cells must be inserted based on the number of cells transmitted on a connection, the operation of access controller 18 affects the number of PM cells to be transmitted. Furthermore, other ATM Layer functions (including, for example, cell rate policing as described in ATM Forum TM4.1—ATM Forum Traffic Management Specification Version 4.1, 1999) may affect the number of cells transmitted, thus affecting the number of Fwd PM cells that must be generated. Accordingly, it is convenient to insert the Fwd PM cells at the ATM Layer. However, this poses potential head-of-line blocking problems and/or output queue buffer overflow problems.

For example, output queue 16A depicted in FIG. 3 currently contains three cells (i.e. those labelled "12", "11" and "14"). This leaves three empty slots (i.e. the three blank, leftmost slots in output queue 16A) into which cells passing through processing queue 22 may be placed. Suppose now that PM 20 determines that it is necessary to insert a Fwd PM cell 24 corresponding to connection "12" into the cell stream within processing queue 22. Fwd PM cell 24 is generated by PM 20 and contains, amongst other statistical indicia, a count of the total number of cells corresponding to connection "12" which PM 20 has detected passing through processing queue 22 since PM 20 last generated a Fwd PM cell corresponding to connection "12". However, access controller 18 has already admitted into processing queue 22 three cells which are destined for output queue 16A, namely the three cells labelled "12". Thus, there is no room for insertion of Fwd PM cell 24 into processing queue 22 and thence into output queue 16A without dropping one of the three connection "12" cells in processing queue 22, which is unacceptable. (After generating and inserting Fwd PM cell 24 as aforesaid, PM 20 clears and restarts its count of the total number of cells corresponding to connection "12".)

The prior art has evolved a variety of solutions to the aforementioned class of head-of-line blocking and/or output queue buffer overflow problems. One such solution, illustrated in FIG. 4, is to provide an access controller 18A and PM 20A adapted to "reserve" a cell slot within output queue 16A into which a Fwd PM cell can be inserted. Specifically, PM 20A signals access controller 18A when PM 20A determines that it is necessary to insert a Fwd PM cell 24A corresponding, for example, to connection "12" into the cell stream within processing queue 22. Access controller 18A responds by reserving one of the empty slots in output queue 16A for use by PM 20A. This may necessitate momentarily halting admission of cells from input source 14A into processing queue 22 until space becomes available in output queue 16A. Access controller 18A then signals PM 20A, indicating grant of the reserved slot, and PM 20A reacts by inserting Fwd PM cell 24A into that slot. In practice however, complex timing and logic problems arise, making it difficult to properly implement such a "reservation" scheme, particularly at high frequencies.

Another prior art solution, illustrated in FIG. 5, is to provide an access controller 18B and PM 20B adapted for "loop-back" insertion of Fwd PM cells from PM 20B to access controller 18B. Specifically, when PM 20B determines that it is necessary to insert a Fwd PM cell 24B corresponding, for example, to connection "12" into the cell stream within processing queue 22, PM 20B generates Fwd PM cell 24B and transmits cell 24B to an input port of access controller 18B, as indicated at 26 in FIG. 5. Access controller 18B eventually admits cell 24B into processing queue 22. By allowing access controller 18B to handle insertion of cell 24B into processing queue 22, the loop-back technique overcomes the above-described problems of the prior art techniques illustrated in FIGS. 3 and 4. Specifically, access controller 18B does not admit cell 24B into processing queue 22 unless there is room in the appropriate output queue (in this case, output queue 16A) for cell 24B, thereby overcoming the head-of-line blocking and/or output queue buffer overflow problems to which the technique illustrated in FIG. 3 is subject. Furthermore, by allowing access controller 18B to handle insertion of cell 24B into processing queue 22, the loop-back technique avoids the timing and logic problems to which the FIG. 4 "reservation" technique is subject.

However, the FIG. 5 loop-back technique is subject to a further problem. After generating Fwd PM cell 24B, PM 20B immediately clears and restarts its count of the total number of cells for the corresponding the ATM connection. But, by the time access controller 18B inserts cell 24B into processing queue 22, additional cells corresponding to connection "12" may have been admitted into the cell stream within processing queue 22. For example, the two leftmost connection "12" cells within processing queue 22 have not yet been "seen" by PM 20B, and those two cells have therefore not been included in Fwd PM cell 24B's count of the total number of connection "12" cells. For correct operation, each Fwd PM cell must contain an accurate count of the total number of cells for the corresponding ATM connection which precede the Fwd PM cell. In the example illustrated in FIG. 5, cell 24B's count of the total number of connection "12" cells is two cells less than the correct number, which is unacceptable. Moreover, the next Fwd PM cell generated by PM 20B for connection "12" will probably also contain an unacceptably inaccurate count of the total number of connection "12" cells, since PM 20B includes the aforementioned two leftmost connection "12" cells in the count which it maintains for such next Fwd PM cell, instead of including them in the count maintained for cell 24B.

Yet another prior art solution (not shown) is to permanently reserve room in each output queue into which a predefined number of Fwd PM cells can be inserted. ATM layer device 10 is then configured such that Fwd PM cells are generated only if there is room for them in the reserved space of the appropriate output queue. This solution works, but wastes an unacceptably large amount of expensive output queue buffer space in ATM systems having many input sources and output queues.

The present invention provides an easily implemented, inexpensive Fwd PM cell generation and insertion technique which overcomes the aforementioned deficiencies of the prior art and conforms to the order-dependant requirements of performance monitoring in high-bandwidth, multi-queue ATM layer devices.

SUMMARY OF INVENTION

The invention facilitates insertion of forward performance monitoring cells into a processing queue coupled to an access controller. A plurality of ATM cell input sources are coupled to the access controller. Each input source supports a plurality of ATM connections. The access controller controllably admits cells from the input sources into the processing queue. The cells are output from the processing queue on one of a plurality of output queues. Each forward performance monitoring cell contains statistical information, including a count of the cells which correspond to one of the ATM connections and which are output through the processing queue. The processing queue is monitored to detect and maintain, for each ATM connection, a count of the total number of cells which pass through the processing queue and which correspond to that ATM connection. In accordance with the invention, before a forward performance monitoring cell corresponding to a particular ATM connection is inserted into the processing queue, an interim cell corresponding to that ATM connection is first transmitted to the access controller, which controllably admits the interim cell into the processing queue. The processing queue is monitored to detect the presence of the interim cell in the processing queue, without interrupting maintenance of the aforementioned counts for the respective ATM connections. Then, while the interim cell remains within the processing queue, the count for the ATM connection corresponding to that interim cell is stored in the interim cell, thereby converting the interim cell into the desired forward performance monitoring cell.

DESCRIPTION

As in the case of prior art FIGS. 2–5, FIG. 6A depicts three ATM cell input sources 14A 14B, 14C and their corresponding output queues 16A, 16B, 16C. Input source 14A and its corresponding output queue 16A is depicted as currently carrying cells corresponding to connections "12", "11" and "14"; input source 14B and its corresponding output queue 16B is depicted as currently carrying cells corresponding to connections "3", "4" and "1"; and, input source 14C and its corresponding output queue 16C is depicted as currently carrying cells corresponding to connection "7". Access controller 18C admits cells from the input sources into processing queue 22 and thence into the appropriate output queue. PM 20C monitors the cell traffic stream passing through processing queue 22, and counts the number of cells on each connection. PM 20C also performs other functions in accordance with ITU-T I.610 and ITU-T I.356 which need not be described here because they have no impact on the present invention.

Figure 6A:
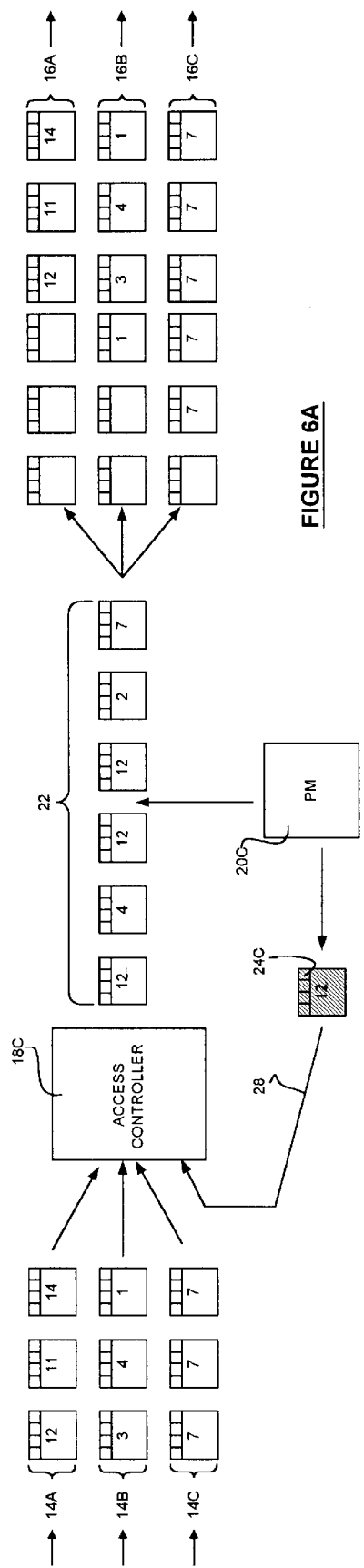
FIGS. 6A and 6B are similar to FIG. 2, and respectively illustrate generation and insertion of an "interim" Fwd PM cell; and, updating of the interim cell, in accordance with the invention.
Figure 6B:
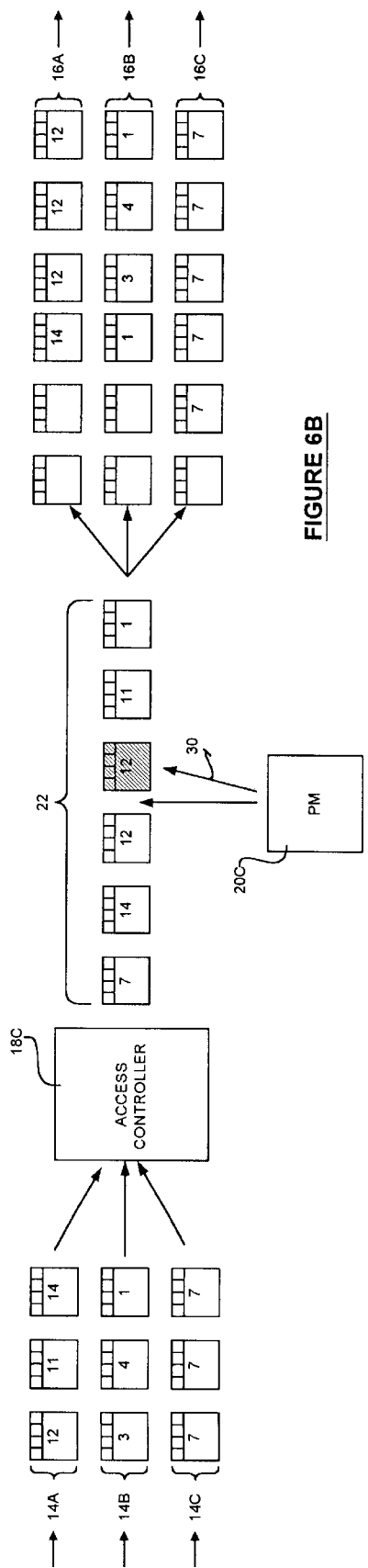

When PM 20C determines that it is necessary to insert a Fwd PM cell corresponding, for example, to connection "12" into the cell stream within processing queue 22, PM 20C first generates an "interim" Fwd PM cell 24C, and transmits cell 24C to an input port of access controller 18C, as indicated at 28 in FIG. 6A. Interim cell 24C is transmitted (and the count for the corresponding connection is re-initialized) after PM 20C has "seen" a prescribed number of cells pass through processing queue 22 (e.g. 128 cells, as determined by ITU-T I.610 and ITU-T I.356 ). More cells may arrive while interim cell 24C is processed as hereinafter described, but the aforementioned standards provide some flexibility in permitting Fwd PM cells to be transmitted after passage of 128–192 cells through processing queue 22. Access controller 18C eventually admits interim cell 24C into processing queue 22, in accordance with its traffic shaping and/or queue management functions. Unlike the prior art, PM 20C does not clear and restart its count of the number of cells on connection "12" after transmitting interim cell 24C as aforesaid, but continues to count the number of such cells. PM 20C also monitors the cell traffic stream passing through processing queue 22 to detect interim cell 24C when it arrives at the point in processing queue 22 monitored by PM 20C. When PM 20C detects interim cell 24C in processing queue 22, PM 20C updates the contents of interim cell 24C by storing (as indicated at 30 in FIG. 6B) in cell 24C the count of the number of cells on connection "12" which PM 20 has detected passing through processing queue 22 since PM 20 last generated a Fwd PM cell corresponding to connection "12". As used herein, the expression "count of the number of cells" means the function-specific fields prescribed by ITU-T I.610 which must be inserted into a Fwd PM cell. These include, but are not limited to, the parameters referred to in section 10.3.1 of ITU-T I.610 as $TUC_{-0}$, $TUC_{-0+1}$, $BEDC_{-0+1}$, MCSN/FPM, EDC (CRC-10), and optionally, TSTP (time stamp). Interim cell 24C is thus converted into a "final" Fwd PM cell containing the required accurate count of the number of cells on the connection to which the Fwd PM cell corresponds (in this case, connection "12").

Figure 1:
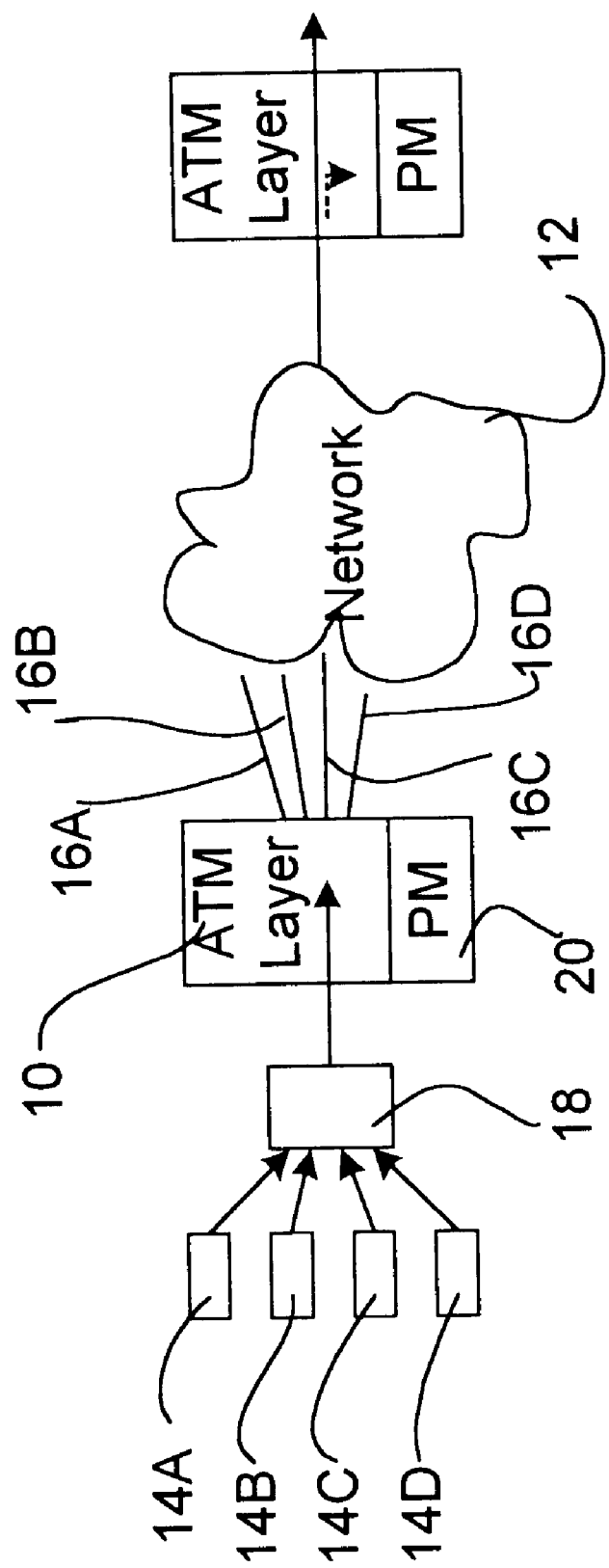
FIG. 1 schematically depicts a prior art ATM layer device which controllably processes cells received from a plurality of sources supporting multiple connections and outputs a well-controlled, queued cell traffic stream to a network.
Figure 2:
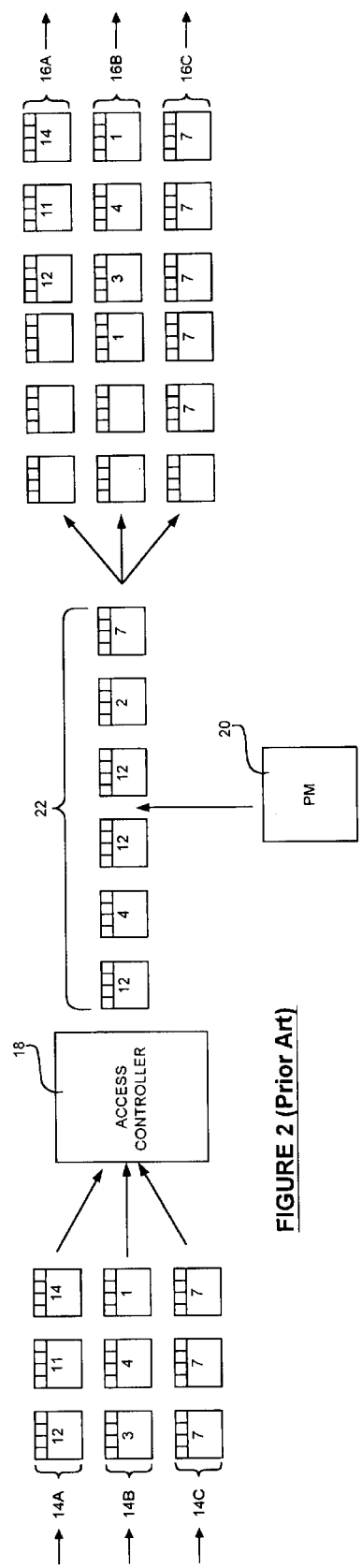
FIG. 2 is an enlarged depiction of the FIG. 1 ATM layer device, and illustrates prior art performance monitoring processing of cells admitted by an access controller from a plurality of input sources supporting multiple connections, for output on a corresponding plurality of output queues.
Figure 3:
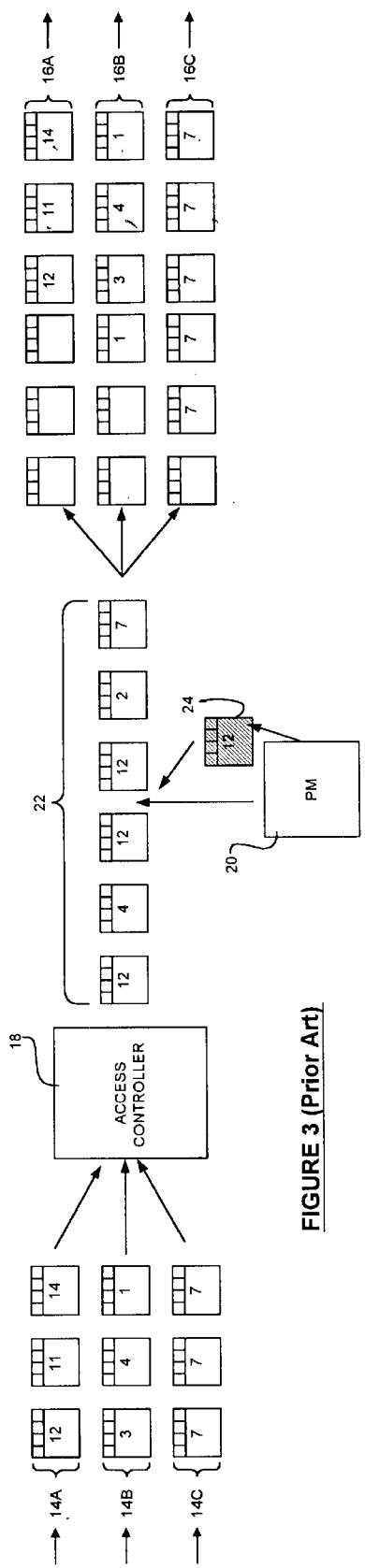
FIG. 3 is similar to FIG. 2, and illustrates a prior art Fwd PM cell insertion technique.
Figure 4:
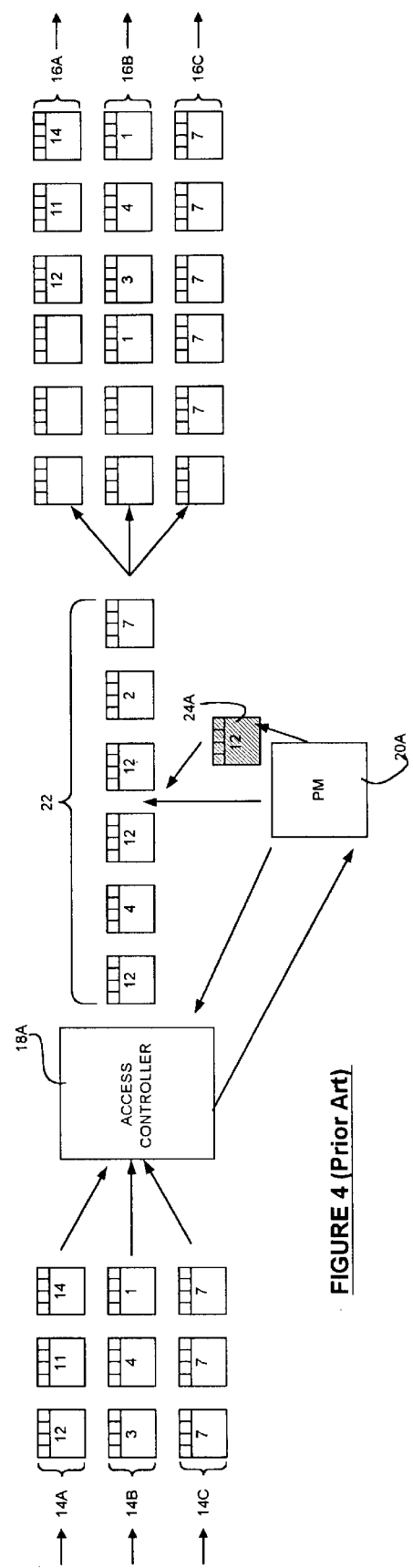
FIG. 4 is similar to FIG. 2, and illustrates a prior art Fwd PM cell reservation and insertion technique.
Figure 5:
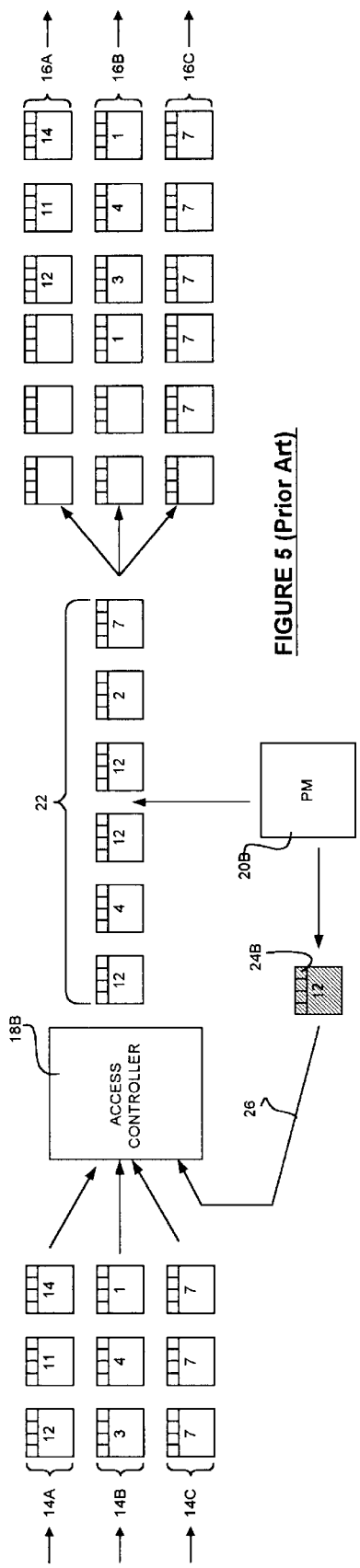
FIG. 5 is similar to FIG. 2, and illustrates a prior art Fwd PM cell loop-back insertion technique.

By allowing access controller 18C to handle insertion of interim cell 24C into processing queue 22, the invention overcomes the above-described problems of the prior art techniques illustrated in FIGS. 3 and 4. Specifically, access controller 18C does not admit interim cell 24C into processing queue 22 unless there is room in the appropriate output queue (in this case, output queue 16A) for interim cell 24C, thereby overcoming the head-of-line blocking and/or output queue buffer overflow problems to which the FIG. 3 prior art technique is subject. By allowing access controller 18C to handle insertion of interim cell 24C into processing queue 22, the invention also avoids the timing and logic problems to which the FIG. 4 "reservation" technique is subject. Furthermore, the invention overcomes the above-described error susceptibility of the FIG. 5 loop-back technique by updating the contents of interim cell 24C after cell 24C emerges from access controller 18C into processing queue 22.

As will be apparent to those skilled in the art in the light of the foregoing disclosure, many alterations and modifications are possible in the practice of this invention without departing from the spirit or scope thereof. For example, interim cells generated and inserted into processing queue 22 in accordance with the invention can also be converted into ATM OAM "fault management" cells. Although such fault management cells are not subject to the order dependency of Fwd PM cells, conversion of interim cells into fault management cells is nonetheless advantageous in reducing the quantity of information stored in interim cells and because access controller 18C can still be used in processing such converted cells. As another example, access controller 18C can be replaced by a fully functional traffic manager (not shown) integrated with ATM layer device 10. Interim cells generated in accordance with the invention can then be transmitted from PM 20C to the traffic manager, thus preventing the insertion of interim cells from disturbing the orderly flow of cells from the input sources to the processing queue and thence to the output queues. This can be accomplished by tagging the interim cell, for example by setting selected bits in appended bytes, or in the "undefined" field following the ATM cell header, to identify it as an interim cell. The scope of the invention is to be construed in accordance with the substance defined by the following claims.

What is claimed is:

1. A method of inserting a forward performance monitoring cell into a processing queue coupled to an access controller which receives ATM cells from a plurality of input sources and controllably admits said cells into said processing queue for output of said cells on one of a plurality of output queues, said forward performance monitoring cell containing a count of cells output through said processing queue and corresponding to a selected ATM connection, said method comprising:

(a) monitoring said processing queue to detect and maintain a count of passage through said processing queue of each one of said cells corresponding to said selected ATM connection;

(b) transmitting an interim cell to said access controller, for controlled admission of said interim cell through said access controller into said processing queue;

(c) monitoring said processing queue to detect the presence of said interim cell in said processing queue, while continuing to maintain said count; and, (d) while said interim cell remains within said processing queue, storing said count in said interim cell, thereby converting said interim cell into said forward performance monitoring cell.

2. A method of inserting forward performance monitoring cells into a processing queue coupled to an access controller which receives ATM cells from a plurality of input sources and controllably admits said cells into said processing queue for output of said cells on one of a plurality of output queues, each one of said input sources supporting a plurality of ATM connections, said forward performance monitoring cells respectively containing a count of cells output through said processing queue and corresponding to one of said ATM connections, said method comprising:

(a) monitoring said processing queue to detect and maintain, for each one of said ATM connections, a count of passage through said processing queue of each cell corresponding to each one of said ATM connections;

(b) for each one of said ATM connections, transmitting an interim cell to said access controller, for controlled admission of said interim cell through said access controller into said processing queue;

(c) monitoring said processing queue to detect the presence of said interim cell in said processing queue, while continuing to maintain said count for each one of said ATM connections; and, (d) while said interim cell remains within said processing queue, storing in said interim cell said count for said one of said ATM connections corresponding to said interim cell, thereby converting said interim cell into said forward performance monitoring cell.

3. A method as defined in claim 1, further comprising:

(a) transmitting said interim cell to said access controller after said count reaches a predetermined value; and, (b) after said storage of said count in said interim cell, re-initializing said count.

4. A method as defined in claim 2, further comprising:

(a) transmitting said interim cell to said access controller after said count for said one of said ATM connections reaches a predetermined value; and, (b) after said storage of said count for said one of said ATM connections in said interim cell, re-initializing said count for said one of said ATM connections.

5. A method as defined in claim 1, wherein said access controller further comprises a traffic manager.

6. A method as defined in claim 2, wherein said access controller further comprises a traffic manager.

7. A method as defined in claim 1, further comprising storing a time stamp in said interim cell before transmitting said interim cell to said access controller.

8. A method as defined in claim 2, further comprising storing a time stamp in said interim cell before transmitting said interim cell to said access controller.

9. Apparatus for inserting a forward performance monitoring cell into a processing queue coupled to access control means for receiving ATM cells from a plurality of input sources and for controllably admitting said cells into said processing queue for output of said cells on one of a plurality of output queues, said forward performance monitoring cell containing a count of cells output through said processing queue and corresponding to a selected ATM connection, said apparatus comprising:

(a) performance monitoring means for monitoring said processing queue to detect and maintain a count of passage through said processing queue of each one of said cells corresponding to said selected ATM connection;

(b) cell transmission means coupled between said performance monitoring means and said access control means, said cell transmission means for transmitting an interim cell from said performance monitoring means to said access control means for controlled admission of said interim cell through said access control means into said processing queue;

said performance monitoring means further for:
(i) monitoring said processing queue to detect presence of said interim cell in said processing queue, while continuing to maintain said count; and,
(ii) while said interim cell remains within said processing queue, storing said count in said interim cell, thereby converting said interim cell into said forward performance monitoring cell.

10. Apparatus for inserting forward performance monitoring cells into a processing queue coupled to access control means for receiving ATM cells from a plurality of input sources and for controllably admitting said cells into said processing queue for output of said cells on one of a plurality of output queues, each one of said input sources supporting a plurality of ATM connections, said forward performance monitoring cells respectively containing a count of cells output through said processing queue and corresponding to one of said ATM connections, said apparatus comprising:

(a) performance monitoring means for monitoring said processing queue to detect and maintain, for each one of said ATM connections, a count of passage through said processing queue of each cell corresponding to said one of said ATM connections;

(b) cell transmission means coupled between said performance monitoring means and said access control means, said cell transmission means for transmitting interim cells corresponding to said respective ATM connections from said performance monitoring means to said access control means for controlled admission of said interim cells through said access control means into said processing queue;

said performance monitoring means further for:
(i) monitoring said processing queue to detect the presence of said interim cells in said processing queue, while continuing to maintain said counts; and,
(ii) while any particular one of said interim cells remains within said processing queue, storing in said one of said interim cells said count for said one of said ATM connections corresponding to said one of said interim cells, thereby converting said one of said interim cells into said forward performance monitoring cell.

11. Apparatus for inserting a forward performance monitoring cell into a processing queue coupled to an access controller coupled to receive ATM cells from a plurality of input sources and controllably admit said cells into said processing queue for output of said cells on one of a plurality of output queues, said forward performance monitoring cell containing a count of cells output through said processing queue and corresponding to a selected ATM connection, said apparatus comprising:

(a) a performance manager coupled to said processing queue to detect and maintain a count of passage through said processing queue of each one of said cells corresponding to said selected ATM connection;

(b) an interim cell transmitter coupled between said performance manager and said access controller to transmit an interim cell from said performance manager to said access controller for controlled admission of said interim cell through said access controller into said processing queue;

said performance manager further:
(i) monitoring said processing queue to detect the presence of said interim cell in said processing queue, while continuing to maintain said count; and,
(ii) while said interim cell remains within said processing queue, storing said count in said interim cell, thereby converting said interim cell into said forward performance monitoring cell.

12. Apparatus for inserting forward performance monitoring cells into a processing queue coupled to an access controller for receiving ATM cells from a plurality of input sources and for controllably admitting said cells into said processing queue for output of said cells on one of a plurality of output queues, each one of said input sources supporting a plurality of ATM connections, said forward performance monitoring cells respectively containing a count of cells output through said processing queue and corresponding to one of said ATM connections, said apparatus comprising:

(a) a performance manager coupled to said processing queue to detect and maintain, for each one of said ATM connections, a count of passage through said processing queue of each cell corresponding to said one of said ATM connections;

(b) an interim cell transmitter coupled between said performance manager and said access controller to transmit interim cells corresponding to said respective ATM connections from said performance manager to said access controller for controlled admission of said interim cells through said access controller into said processing queue;

said performance manager further:
(i) monitoring said processing queue to detect the presence of said interim cells in said processing queue, while continuing to maintain said counts; and, (ii) while any particular one of said interim cells remains within said processing queue, storing in said one of said interim cells said count for said one of said ATM connections corresponding to said one of said interim cells, thereby converting said one of said interim cells into said forward performance monitoring cell.

13. Apparatus as defined in claim 11, said access controller further comprises a traffic manager.

14. Apparatus as defined in claim 12, said access controller further comprises a traffic manager.

* * * * *